United States Patent [19]

Olson

[11] 4,050,152
[45] Sept. 27, 1977

[54] CABLE AND WIRE CUTTER

[76] Inventor: John R. Olson, 914 N. Lamer St., Burbank, Calif. 91506

[21] Appl. No.: 714,480

[22] Filed: Aug. 16, 1976

Related U.S. Application Data

[63] Continuation-in-part of Ser. No. 627,663, Oct. 31, 1975, abandoned.

[51] Int. Cl.² .................. B21F 13/00; B26B 27/00
[52] U.S. Cl. .................................. 30/90.1; 7/5.6;
30/90.6; 30/226; 30/252; 30/254
[58] Field of Search .................. 30/226, 90.1, 90.2,
30/90.6, 90.7, 91.1, 91.2, 92, 254, 257, 252, 251,
142; 7/5.4, 5.6, 3 R

[56] References Cited

U.S. PATENT DOCUMENTS

| 148,854 | 3/1874 | Secor | 30/226 |
|---|---|---|---|
| 359,684 | 3/1887 | Morrison | 30/254 |
| 452,917 | 5/1891 | Hayden | 30/254 |
| 644,350 | 2/1900 | Decelle | 30/252 |
| 1,299,100 | 4/1919 | Anderson | 30/252 X |
| 2,249,515 | 7/1941 | Carroll | 30/226 |
| 2,745,178 | 5/1956 | Rogoff | 30/252 X |
| 2,870,538 | 1/1959 | Townshend | 30/254 |
| 2,873,526 | 2/1959 | Visconti | 30/254 |
| 3,012,321 | 12/1961 | Townshend | 30/254 X |
| 3,461,555 | 8/1969 | Bliznak | 30/254 |

FOREIGN PATENT DOCUMENTS

| 790,261 | 9/1935 | France | 30/252 |
|---|---|---|---|
| 904,467 | 8/1962 | United Kingdom | 30/254 |

Primary Examiner—Al Lawrence Smith
Assistant Examiner—J. T. Zatarga
Attorney, Agent, or Firm—Donald Diamond

[57] ABSTRACT

A shearing cutter for wire and cable, particularly insulated metal wires and wire bundles as used in electrical and electronic circuits, is constructed in the form of a hand tool with elongated, hinged handles adapted to develop shearing forces between cooperating blades cantilevered beyond the hinge point from each of the handles. The blades are symmetrical in shape and define a substantially circular opening between semicircular bights sharpened into cutting edges in each of the blades. A wire or cable is maintained in a central location with respect to the aforementioned bights by the enveloping nature of the cutting edges, resulting in a clean, uniform shear plane.

5 Claims, 6 Drawing Figures

CABLE AND WIRE CUTTER

CROSS-REFERENCE TO RELATED APPLICATION

This application is a continuation-in-part of U.S. Pat. application Ser. No. 627,663, filed on Oct. 31, 1975, and entitled Cable and Wire Cutter, now abandoned.

BACKGROUND OF THE INVENTION

The invention relates in general to cutting shears and, more particularly, to cutting shears for metallic wire and cable, wherein the article being cut is centrally supported between semi-circular cutting edges.

The requirement for severing a length of wire or cable is one of the more common problems encountered in the electrical and electronic trades. To make connections, to prepare splices, to subdivide cable hardnesses, and to perform many similar operations it is necessary to sever the cable, formed of one or more metallic conductors, with or without insulating sheaths.

Cable cutters of the prior are come in several forms. So-called 'dikes,' or diagonal cutters, have short, sharp cutting blades whose cutting edges are laterally aligned, so that the cutting action is not in pure shear, but rather in compression. In some cutters only one blade is sharp and the other is a flat anvil to support the cable. In other forms, the cutting edges are formed into shears, that is, blades which slide past each other; but in the devices of the prior art these blades are either straight, or curved in the same rotational sense.

One of the great disadvantages of the cutters of the prior art lies in the tendency of the cable to extrude out of the blade jaws, due to the axial force component developed as the blades close from an open — relatively angled — alignment toward a parallel position at the end of the cutting stroke. Another disadvantage lies in the tendency of the cable to be squashed flat between the blades, distorting the shape of the cable, almost invariably circular, and in the case of multiconductor cables scrambling the order thereof.

It is, therefore, a primary object of the invention to provide cable-cutting tools which do not develop unbalanced axial forces during the cutting stroke and, hence, have no tendency to eject the cable from between the cutting blades.

It is another object of the invention to provide cutting shears which develop a minimal tendency of distorting originally circular wires and cables in applying the forces necessary to sever same.

It is a further object of the invention to provide a wire and cable cutter satisfying the aforementioned objects which is simple and economical to construct, easy to use and which can be embodied in a hand tool of substantially conventional construction and operation.

SUMMARY OF THE INVENTION

The foregoing objects of the invention, and other objects and advantages which shall become apparent from the detailed description of the preferred embodiment thereof below, are attained in a hand tool having unique cutting members.

The hand tool comprises a pair of cooperating, elongated members pivotally secured at a locus which separates the members into a pair of handles and a pair of primary cutting blades, with the members being mutually pivotal between an opened and a closed position.

Each of the primary cutting blades comprises an inner sharpened edge, an outer blunt end having inbound and outbound edges, a back face extending from the sharpened edge to the inbound edge of the blunt end, and a front face extending from the sharpened edge to the outbound edge of the blunt end.

The inner sharpened edges have a substantially semi-circular configuration and, in combination, define oppositely disposed curves; the back faces are substantially flat and are disposed in abutting and traversing relationship; and the front faces comprise curved ramps rising from the semi-circular sharpened edges.

The distance from the semi-circular sharpened edge to the outer blunt end, in each primary cutting blade, is generally greater than the radius of the semi-circular edge and, preferably, about twice the radius of the semi-circular edge.

Since the facing edges of the two blades are formed into semi-circular cutouts, the cable, to be cut, is engaged by the transverse diameter of a substantially circular cutting assembly, which narrows into a symmetrical intercept of circular arcs as the blades perform their shearing function.

In this manner the axial forces on the cable, the forces operating in the plane of symmetry of the cutting blades, are always balanced and there is no tendency for the cable to be extruded away from the point of maximum shear.

Also, the cutting action begins as soon as the blades engage the outer periphery of the cable and the blades perform a continuous shearing action until they fully overlap, thereby obviating any major deformation of the cable cross section during severance of the cable.

The two major components of the cable cutter of the invention are substantially identical, referring here to the opposing blade/handle combinations, and the only other part necessary to the assembly of the tool is the rivet, or threaded fastener, holding the two together at the pivot point.

The material of manufacture for the blades is suitably a high strength ferrous alloy, adapted to be hardened and ground into a sharp cutting edge; other materials may be preferred for certain applications and the use of carbide inserts — or inserts or coatings of other hard materials — may be employed to advantage where the cable, or wire, to be cut is of a hard composition itself such as wire rope.

In a further development of the invention, secondary blades may be provided in extensions from the outer blunt ends of the primary cutting blades, for use in cutting and/or stripping insulation from small conductors.

DESCRIPTION OF THE PREFERRED EMBODIMENT

Figure 1:
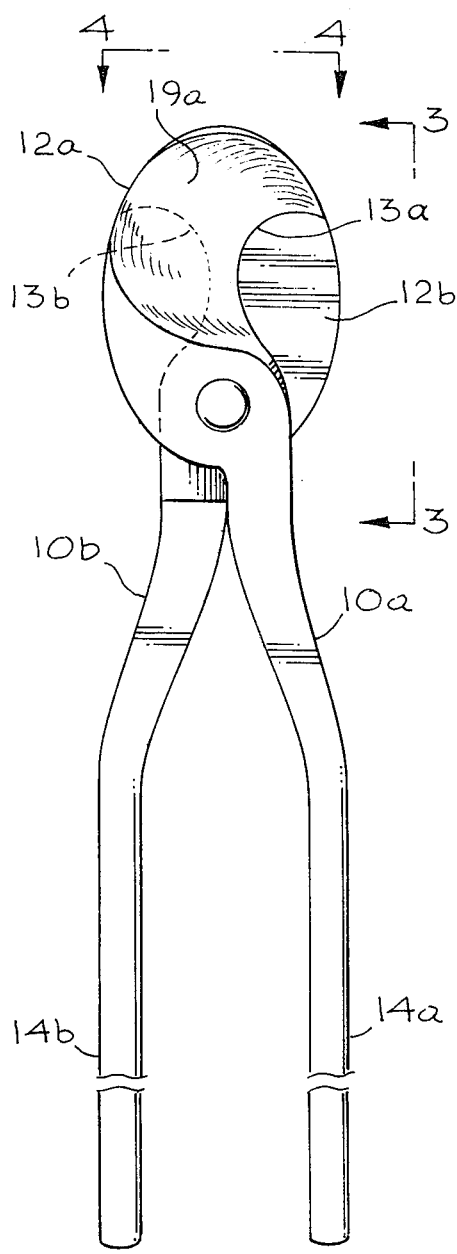
FIG. 1 is a frontal view of the cutting tool of the invention, in the closed-blade position.

Referring now to FIG. 1 of the drawings, there is shown a cable and wire cutting tool which is constructed of like components 10a and 10b. One end of the tool is defined by a pair of elongated handles 14a and 14b and the other end of the tool forms a pair of primary cutting blades 12a and 12b.

The inner sharpened edge of each primary cutting blade has a semi-circular configuration 13a, 13b. The thickness of each primary cutting blade advantageously increases substantially uniformly from the semi-circular sharpened edge to the outer blunt end to thereby define a curved ramp in the front face of the blade which extends from the semi-circular edge to the outbound edge of the blunt end, as shown at 19a. The back faces of the primary cutting blades are abutting, flat surfaces, as shown at 15b, which are adapted to slidably traverse one another.

Figure 2:
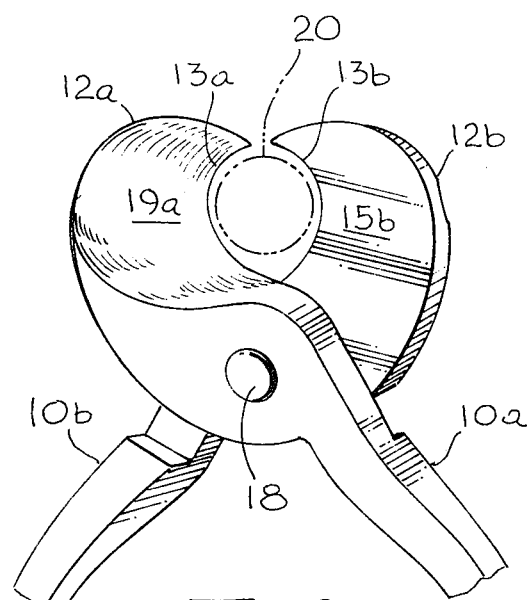
FIG. 2 is a partial frontal view of the embodiment of FIG. 1, showing the primary cutting blades thereof in the opened-blade position, about to engage a circular cable.
Figure 3:
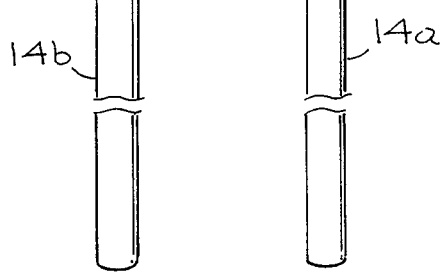
FIG. 3 is a partial side view, corresponding to the perspective line 3—3 in FIG. 1, illustrating the manner of assembly by means of a riveted hinge.
Figure 4:
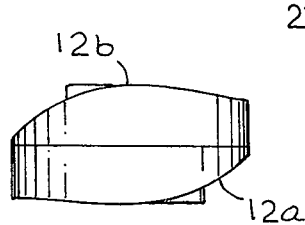
FIG. 4 is a top view of the cutting blades of the embodiment of FIG. 1, taken along perspective line 4—4 therein.

The partial frontal view of FIG. 2 corresponds to the upper half of FIG. 1 and shows the primary cutting blades 12a, 12b spread apart by the rotational displacement of the handles 14a, 14b about a conjoint pivot 18. A round cable 20 is shown passing through the separated semi-circular edges 13a, 13b, ready to be severed into two parts by the reverse movement of the handles.

The gradient of the ramps, as at 19a, is made as shallow as possible, since the cut ends of the cable 20 — or its equivalent work piece — will tend to be displaced angularly in proportion to the slope of the ramp; the thinner the blade the less effort required for cutting and the less the distortion of the cable due to the shearing effort itself.

The mean ramp gradient of each primary cutting blade is substantially the same and is selected in the range from about 33% to about 50% which corresponds to an angle from about 20° to about 27°. Preferably, the mean ramp gradient should be at the shallower end of the range, that is, nearer to 33%. The mean ramp gradient is determined with respect to the principal shearing line with the latter being defined as the line passing through the initial contact points of the primary cutting blade with a central circular cable disposed within the cutting orifice of the tool. Where the blade ramp is non-uniform, the gradient may increase from an initial low value at the inner sharpened edges 13a, 13b, toward the outer blunt end, as long as the limiting gradient does not exceed about 50%. It has also been found advantageous to increase the gradient at angular positions away from the principal shearing line, since this configuration ensures a continuous centering of the cable being cut by reducing the shearing effort along the principal shearing line.

The tool is advantageously made with a substantial overlap, in the closed position, between the deepest points of the semi-circular sharpened edges 13a, 13b. This overlap permits sharpening of the blades to compensate for wear and tear in use. Since resharpening the cutting blades of diagonal cutters and similar tools of the prior art can only be performed with difficulty, and in some instances not at all, the ready provision of excess material for such purposes is a major advantage of the cutting tool of this invention.

To insure non-distorting, smooth and continuous cutting action, the distance in each primary cutting blade from the principal shear line along the semi-circular sharpened edge to the outer blunt end in the transverse direction as illustrated in FIG. 2, must be greater than the radius of the semi-circular edge and, thus, greater than the radius of the largest cable which may be encompassed within the cutting orifice of the tool. However, in order to insure complete severance of the cable by an overlap of the sharpened edges at the end of the cutting stroke, to provide excess material for sharpening the blades, and to compensate for potential non-uniformity within the cable, which might result in unequal penetration by the two primary cutting blades, the width of each blade, namely, the distance from principal shear line to the outer blunt end, in the transverse direction as shown in FIG. 2, should approximate twice the radius of the semi-circular edge and, thus, should be substantially equal to the diameter of the largest cable which may be encompassed within the cutting orifice of the tool.

The component halves 10a, 10b are assembled into the complete cutting tool by the insertion of a riveted or bolted pivot pin 18 into orifices intermediate between the handle portion 14a, 14b and the blade portion 12a, 12b of each. The pin 18 — shown as a rivet, the preferred method of fastening — is hammered tight until the back faces (15b) of the tool are in good sliding contact.

In the embodiment of FIGS. 1 through 4 the upper extremities of the blades 12a and 12b are formed into a continuous overlapping arc, so that the tool presents a curved, non-snag surface in the closed position. This construction contributes to safe storage and use of the tool, the sharp point of the bights 13a, 13b being covered by the more substantial outer blunt end of the cooperating tool-half.

Hand tools corresponding to the embodiment of FIG. 1 may be made with handles having lengths from six inches to ten inches and with primary cutting blades having widths — along their principal shearing lines — from one-half inch to one inch. A hand tool of intermediate size in this range will readily shear wires and cables in gage numbers ranging from 28 through 1-0 with reasonable effort and produce smoothly sheared, cut faces.

Figure 5:
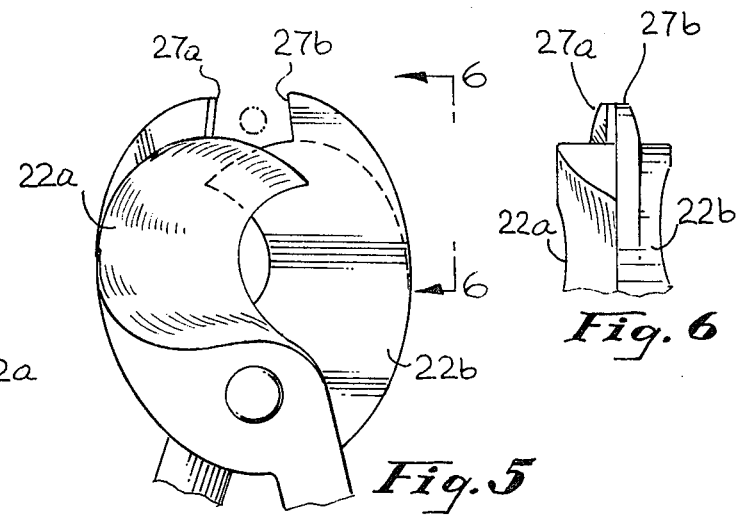
FIG. 5 is a partial frontal view of an alternate embodiment of the invention, incorporating secondary cutting blades in extensions from the outer blunt ends of the primary cutting blades.
Figure 6:
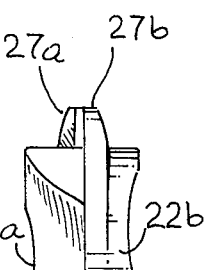
FIG. 6 is a fragmentary side view taken along line 6—6 of FIG. 5.

The embodiment of FIGS. 5 and 6 differs from the previously described embodiment in the addition of secondary cutting blades 27a, 27b to the outer blunt ends of the primary cutting blades 22a, 22b. The secondary blades, which are provided with linear cutting edges, are angled towards each other in the outbound direction such that the point of intersection between them, as the handles of the cutting tool are closing, travels from the outermost edges of the secondary blades towards the pivot. The secondary blades 27a, 27b are intended for subsidiary operations such as the cutting away of insulation from wires of relatively small diameter.

The inward inclination of the secondary cutting blades ensures the retention of the work piece between the jaws of the tool, since the cutting forces tend to pull the wire against the outer blunt ends of primary blades 22a and 22b as the tool handles are pressed together.

The secondary cutting blades 27a, 27b are also arranged to overlap, to provide material for resharpening and to have continuously curved external contours so that the closed tool presents no edges or discontinuities.

The semi-circular sharpened edges of the blades 22a and 22b are formed in a manner identical to the corresponding portions 13a and 13b of the previously described embodiment of the invention.

The cutting tool described hereinabove is primarily intended for use in the electrical trades and to shear copper and aluminum wire and cable. For such use the employment of low-alloy steels in the mating parts 10 of the tool is very satisfactory, providing good wear resistance and toughness. Stronger materials or the use of inserts and coatings at the cutting edges permits the use of the tool on wires and cables made of steel.

While in the foregoing description and accompanying drawing there has been shown and described the preferred embodiment of this invention, it will be understood, of course, that minor changes may be made in the details of construction as well as in the combination and arrangement of parts without departing from the spirit and scope of the invention as claimed.

That which is claimed is:

1. A hand tool for cutting wire, cable and the like comprising:
    a pair of cooperating, elongated members pivotally secured at a locus which separates said members into a pair of handles and a pair of primary cutting blades, said members being mutually pivotal between an opened and a closed position;
    each of said primary cutting blades comprises an inner sharpened edge, an outer blunt end having inbound and outbound edges, a back face extending from the sharpened edge to the inbound edge of the blunt end, and a front face extending from the sharpened edge to the outbound edge of the blunt end;
    each of said inner sharpened edges has a substantially semi-circular configuration and, in combination, define oppositely disposed curves;
    each of said back faces is substantially flat and said back faces are disposed in abutting relationship and traverse each other in such relationship; and
    each of said front faces comprises a curved ramp rising from the semi-circular sharpened edge and extending to the outbound edge of the blunt end, with the gradient of each ramp being substantially the same and in the range between 33% and 50%.

2. A hand tool according to claim 1 wherein the pair of cooperating members are substantially identical in shape and size.

3. A hand tool according to claim 2 wherein the semi-circular sharpened edge of each primary cutting blade is overlapped by the substantially flat back face of the other primary cutting blade in the closed position of the tool.

4. A hand tool according to claim 1 wherein, in each primary cutting blade, the distance from the inner semi-circular sharpened edge to the outer blunt end, in the transverse direction, is greater than the radius of the semi-circular sharpened edge.

5. A hand tool according to claim 4 wherein the distance from the inner semi-circular sharpened edge to the outer blunt end, in the transverse direction approximates twice the radius of the semi-circular sharpened edge.

* * * * *